Patented Sept. 20, 1932

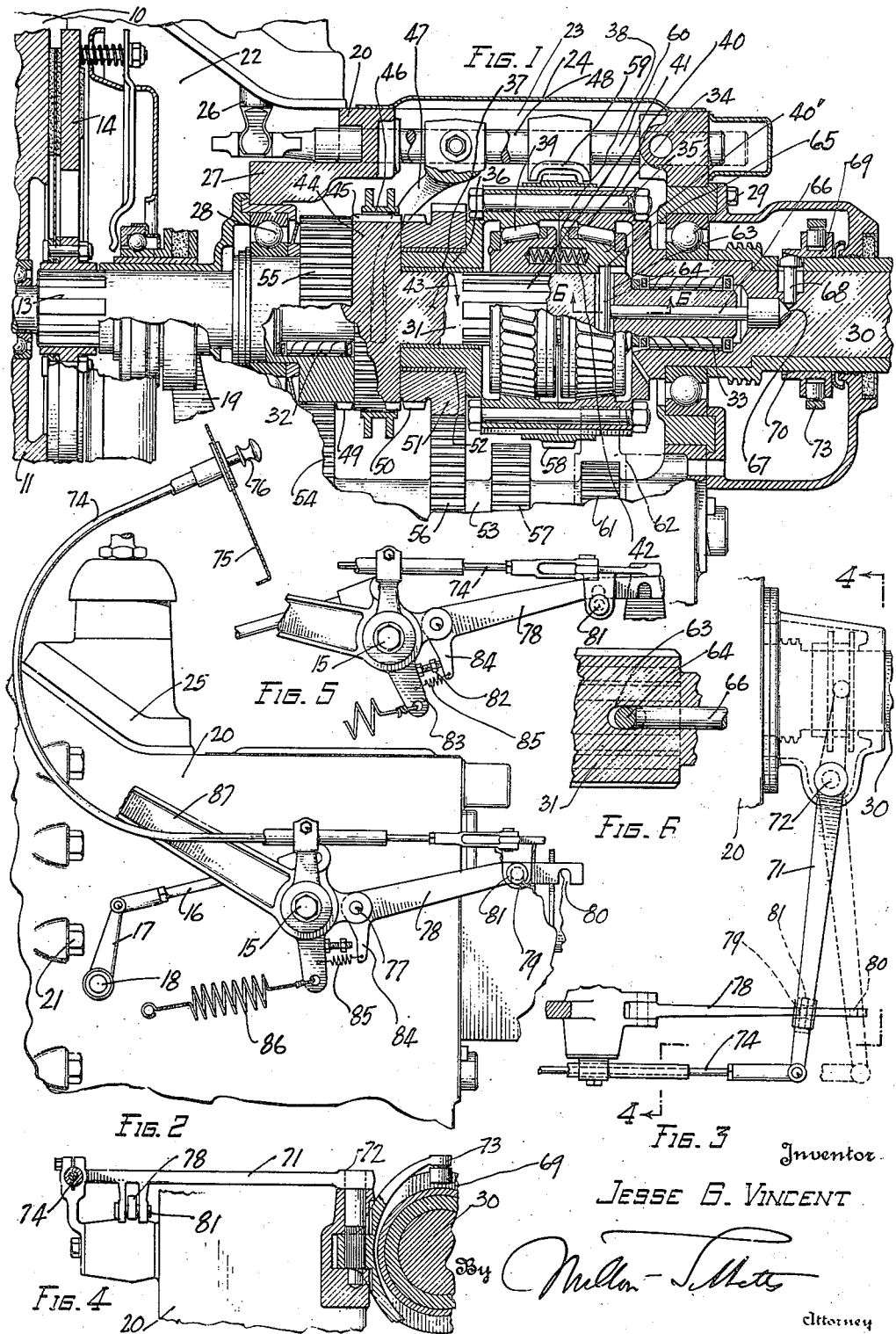

1,878,556

UNITED STATES PATENT OFFICE

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE TRANSMISSION

Application filed June 7, 1929. Serial No. 369,057.

This invention relates to motor vehicles and particularly to transmission mechanism such as is used on motor vehicles.

The conventional form of transmission mechanism or gearing used on motor vehicles today is what is termed a three forward speed and reverse gearing. The various speeds and reverse are obtained by shifting the gears at the time the engine is disconnected from the gearing as by throwing out the clutch which is arranged between the engine and the gearing. In this construction, when any one of the speeds of the transmission is operative, the vehicle may be driven by the engine, or if the engine throttle is closed the momentum of the vehicle may drive the engine through the transmission. Thus the engine may act as a brake. Particularly is this braking action noticeable when the transmission is in first or second speed gear. Under these circumstances it is evident that the vehicle may be allowed to coast without the braking effect of the engine, only by throwing out the clutch or moving the gears of the transmission into neutral position, and since this requires an act of the operator, the result is that most driving is done in gear.

It has been proposed that a one-way clutch device may be arranged between the transmission mechanism and the driving wheels of the vehicle, preferably immediately at the rear end of the gearing, and thus when the engine throttle is closed the vehicle may overrun the engine, as it were, so that there is no braking effect of the engine on the vehicle. This is called "free-wheeling". In some cases the "free-wheeling" device or one-way clutch has been made so that it can be rendered inoperative by the movement of a lever so that the braking effect of the engine may be used through the transmission mechanism in the usual way.

It is one of the objects of the invention to provide a connection to the clutch device of the speed gearing so that the gear box itself need not be elongated.

Another object of the invention is to provide a connection at the rear end of the gear box for rendering the clutch device of the gearing inoperative, thereby retaining the gear box substantially the same length as without the clutch disengaging device.

Other objects of the invention will appear from the following description taken in connection with the drawing, which forms a part of this specification, and in which:

Fig. 1 is a longitudinal sectional view through the transmission mechanism of a motor vehicle embodying the invention;

Fig. 2 is a side elevation of the gear box shown in Fig. 1;

Fig. 3 is a plan view of the interlocking mechanism;

Fig. 4 is a sectional view substantially on the line 4—4 of Fig. 3;

Fig. 5 is an elevation of the interlocking mechanism in unlocked position, and

Fig. 6 is an enlarged detail view substantially on the line 6—6 of Fig. 1.

Referring to the drawing, the rear end of a motor vehicle engine is shown at 10 and the engine fly wheel is indicated at 11, this being mounted upon or forming the rear end of the crank shaft. An aligned shaft 13, which will be termed the driving shaft, is driven by the crank shaft 11 of the engine through a clutch 14 of the usual or conventional form. The clutch is operated by the usual rock shaft 15 and connections including the link 16, arm 17, rock shaft 18 and lever arm 19.

A casing 20 is secured to the rear end of the casing of the engine, as by the bolts 21, and this casing 20 is formed with two compartments, a compartment 22 surrounding the clutch and a compartment 23 which forms the gear box or gear casing. A cover 24 is shown as forming the upper portion of the compartment 23 and a cover 25 is arranged over an opening in the clutch compartment 22 and forms a support for a gear shifter lever 26 which shifts the sliding gears hereinafter referred to. A wall 27 separates the compartments 22 and 23 and in this wall a ball bearing 28 supports the rear end of the driving or clutch shaft 13.

Mounted in a bearing 29 at the rear end of the casing is a driven shaft 30 preferably axially aligned with the driving shaft 13. This shaft 30 is adapted for connection through suitable universal joints with the rear axle and driving wheels of the vehicle. An intermediate shaft 31 has a bearing 32 in the driving shaft 13 and a bearing 33 in the driven shaft 30. Thus the shaft 31 is axially aligned with the shafts 13 and 30.

The driven shaft 30 is enlarged at 34 and telescopes with the intermediate shaft 31. In fact, the enlarged part of the shaft 30 is formed in two pieces secured together by bolts 35 and its extreme forward end is again contracted as at 36 and has a bearing on the cylindrical part of the intermediate shaft 31 as at 37. This enlarged part 34 of the driven shaft provides a housing for a clutch device indicated generally at 38. This device is preferably a double one-way clutch of the type shown in patent to Humfrey No. 1,670,197, dated May 15, 1928. The left hand part 39 of the clutch device 38 has its rollers and cones so positioned and formed that a positive drive will take place from the shaft 31 to the shaft 30 while the shaft 30 will not drive the shaft 31. In other words, through the clutch part 39 the drive from left to right will be positive whereas there would be "free-wheeling" from the right toward the left. The right hand part 40 of the clutch device 38 will positively drive from the shaft 30 to the shaft 31 but will "free-wheel" in the opposite direction. The opposing cones of these two clutch devices, which are splined on the shaft 31 as shown at 41, are yieldingly separated by several springs 42 for the purpose of causing the clutch rollers to take hold.

From the above description of the clutches 39 and 40 it is evident that when both of them are operative the drive between shafts 31 and 30 will be positive in both directions because the left hand clutch 39 will positively drive from shaft 31 to shaft 30 and the right hand clutch will positively drive from shaft 30 to shaft 31. This is on the assumption that the shafts are rotating in a clockwise direction as shown by the arrow 43 on shaft 31.

Intermediate shaft 31 is enlarged at 44 and is provided with peripheral teeth 45 and slidably arranged on these teeth 45 and meshing with them is a ring 46 which may be moved from one position to another by an arm 47 mounted on a shifter rod 48 in the upper part of the casing. A toothed clutch element 49 is formed at the rear end of the driving shaft 13, and a similar toothed clutch element 50 is connected to a gear 51 which is loosely or rotatably mounted on the contracted portion 36 of the driven shaft 30, so that it surrounds the intermediate shaft 31. This bearing is shown at 52. The ring 46 may be moved by the shifter rod 48 into clutching engagement with the clutch element 49 or clutch element 50 so that the intermediate shaft 31 may be connected either to the driving shaft 13 for direct drive or to the gear 51 for a geared drive.

Mounted in the gear compartment 23 of the gear casing is a lay shaft 53 upon which is a gear 54 in constant mesh with a gear 55 on the driving shaft 13. This lay shaft 53 is always driven by the driving shaft 13 at a reduced speed. Lay shaft 53 also has a gear 56 in constant mesh with gear 51 and thus when the intermediate shaft 31 is clutched to gear 51, there is an indirect geared drive at reduced speed from the driving shaft 13 through gears 55 and 54 to lay shaft 53 and through gears 56 and 51 to intermediate shaft 31.

Since the direct drive and the above described geared drive are to the shaft 31, these drives must pass to the driven shaft 30 through the one-way clutch 39, and the reverse drive from the shaft 30 would be through the clutch device 40 and consequently there would be a positive drive in both directions as long as both clutch devices remained operative.

On lay shaft 53 is also a gear 57, and on the enlarged part 34 of the driven shaft 30, and surrounding the clutch device 38, is a gear 58. This gear 58 is keyed or splined upon the driven shaft and it may be shifted from one position to another by a yoke 59 on a shifter rod 60 arranged parallel to the rod 48 above described. Either one or the other of these rods 48—60 may be moved from a neutral position to positions forward and back by the shifter lever 26 in the usual way.

Also on the lay shaft 53 is a gear 61, smaller than the gear 57, which gear 61 constantly meshes with a reverse gear 62 suitably mounted in the casing 23. The gear 58 may be moved into mesh either with the first speed gear 57 or the reverse gear 62 so that the drive from the shaft 13 to the shaft 30 may be effected through either of these gears. By thus arranging the gear 58 on the outside of the enlarged portion 34 of the driven shaft 30, the clutch device 38 may be arranged within and surrounded by the sliding gear 58, and thus conserve space lengthwise of the gear box.

Since the first speed gear through the gear 58 is direct to the driven shaft 30, this particular speed drives around the clutch device and consequently there can be no "free-wheeling" between the driving and driven shafts when this speed is used, and the same thing is true of the reverse speed.

Since the clutch devices 39 and 40 act in opposite directions, there can be no free-wheeling as long as both of these clutch devices are operative. For the purpose of allowing "free-wheeling" one of the clutches may be rendered inoperative and this mechanism is shown in connection with the right hand clutch 40. To render it inoperative it is only necessary to move the cone 40' slightly to the left against the action of the springs 42. The means for rendering the clutch device 40 inoperative, extends through portions of the shafts 30 and 31 and the device for operating the mechanism is mounted on the shaft 30 rearwardly of the bearing 29 so that no additional space within the gear box is required for this purpose. Thus, the bearings of the gears may be retained in close proximity as in the conventional gear box and no additional shaft length is required and consequently quietness is retained.

In the zone of the clutch device 40 the shaft 31 is formed with a cross slot 63 in which is a pin 64 extending into the cone 40' as shown at 65. A pin 66 extends from the cross pin 64 through the rear end of the shaft 31 and into the shaft 30, and the rear end of the pin 66 is beveled as at 67 and in contact with a second cross pin 68 which extends to the circumference of the shaft 30. A sleeve 69 slides on the shaft 30 and has a conical front end 70 adapted to slide over and move the cross pin 68. The inward movement of the cross pin 68 moves the pin 66 endwise and this moves the cross pin 64 and the cone 40' against the action of the springs 42. Thus as the sleeve 69 is moved to the left to depress the pin 68 the clutch device 40 is rendered inoperative. In this position of the clutch device there will be no drive from the shaft 30 to the shaft 31 and consequently the mechanism would free-wheel in that direction, while at the same time there would be a positive drive from shaft 31 to shaft 30 through the clutch device 39, assuming all along that the shafts rotate in a clockwise direction as indicated by the arrow 43.

The sleeve 69 may be manually shifted from one position to another by a lever 71 pivoted at 72 and having a yoke 73 operating in a channel in the sleeve. A Bowden wire 74 leads from the end of the lever 71 to the dash 75 of the vehicle or other convenient place where the operator can reach it. A knob 76 is attached to the operating end of the Bowden wire.

It is found to be undesirable to suddenly shift the clutch device 40 from one position to another when the parts are operating under power from the engine. Consequently the mechanism is so arranged that the clutch device 40 cannot be shifted when the driving clutch 14 of the transmission mechanism is engaged. Thus there is pivotally mounted on the rock shaft 15, as at 77, a lock bar 78 which has two notches 79—80 adapted to engage a pin 81 on the lever 71 when said lever is in either of its extreme positions. Thus, when one of the notches 79—80, engages and holds the pin 81 the lever 71 cannot be moved by the operator. But the lock lever 78 is lifted as the driving clutch 14 is moved to disengaging position. Thus, in Fig. 2 the clutch rock shaft 15 is in clutch engaging position and in Fig. 5 the rock shaft 15 has been moved to disengaged position, and in this position it will be seen that an adjustable pin 82 on an arm 83 of the rock shaft 15 has engaged a foot 84 on the lock lever 78 and lifted the lock lever from engagement with the pin 81 of the lever 71. When the parts are in that position the lever 71 may be moved by the operator to shift the position of the clutch device 40. A spring 85 tends to draw the lever 78 down to its locking position. There is also a spring 86 which tends to rock the shaft 15 towards engaging position. The conventional pedal lever 87 is mounted on the rock shaft 15 for operating the latter.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In transmission mechanism, the combination of driving and driven shafts, oppositely acting one-way clutches between said shafts, and means actuating from the outside of one of said shafts and extending through a portion of the other shaft for releasing one of said clutches.

2. In transmission mechanism, the combination of a casing, driving and driven shafts, therein a bearing for the driven shaft in a wall of said casing a releasable clutch device between said shafts on one side of said bearing and means extending partly within said driven shaft and operable from the other side of said bearing for rendering said clutch device inoperative.

3. In transmission mechanism, the combination of driving and driven shafts, a one-way clutch between said shafts, and means for moving said one-way clutch to inoperative position, comprising a shifting rod extending from the clutch through a portion of both of said shafts, a cross pin mounted in one of said shafts and acting to shift said rod, and a sleeve surrounding the shaft containing said pin and operating to shift said pin and rod.

4. In transmission mechanism, a driving shaft, a driven shaft having an enlarged portion, a bearing on said driven shaft for said driving shaft, a bearing on said driving shaft for said driven shaft, said enlarged portion of said driven shaft being between said bearings, one-way driving means within the enlarged portion of said driven shaft and operatively engaging said shafts between said bearings in one-way driving relation, and control mechanism extending through the shafts to within the enlarged portion of the driven shaft to disengage said one-way driving means.

In testimony whereof I affix my signature.

JESSE G. VINCENT.